C. SPILLAN.
VALVE.
APPLICATION FILED JAN. 23, 1912. RENEWED DEC. 11, 1912.
1,069,198.
Patented Aug. 5, 1913.
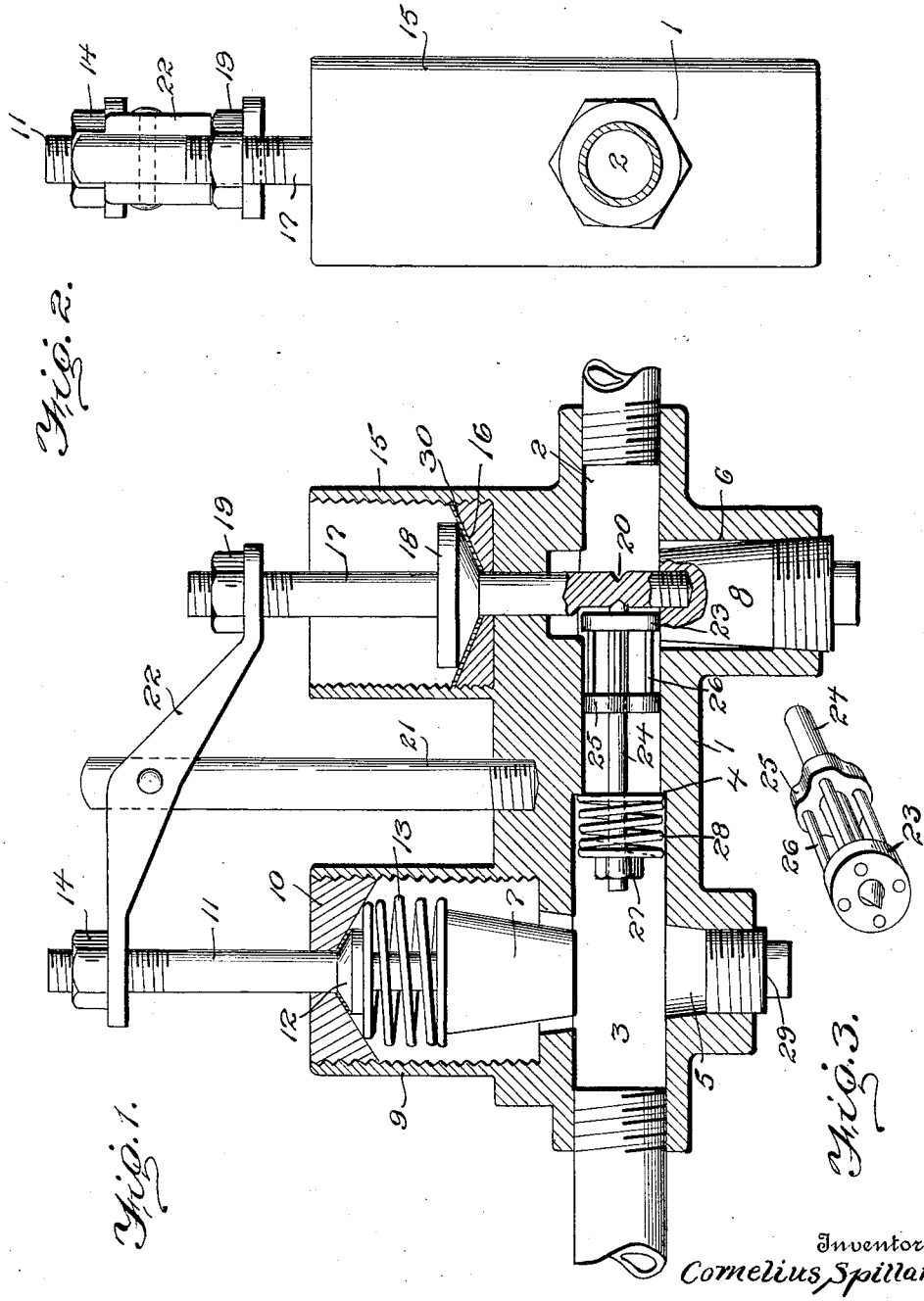
Inventor
Cornelius Spillan

UNITED STATES PATENT OFFICE.

CORNELIUS SPILLAN, OF STEUBENVILLE, OHIO.

VALVE.

1,069,198.   Specification of Letters Patent.   Patented Aug. 5, 1913.

Application filed January 23, 1912, Serial No. 672,974. Renewed December 11, 1912. Serial No. 736,237.

*To all whom it may concern:*

Be it known that I, CORNELIUS SPILLAN, citizen of the United States, residing at Steubenville, in the county of Jefferson and State of Ohio, have invented certain new and useful Improvements in Valves, of which the following is a specification.

This invention has relation to valves adapted to be applied to gas, water and other pipes for the purpose of preventing damage or injury in case the gas or water should be cut off from its source of supply and again turned on through the service pipe of a building while the discharge valves are open.

With this object in view the valve is so constructed that it is held in an open position by the pressure of the fluid passing through the same, and as soon as the passage of fluid is interrupted and its pressure is thereby reduced the valve automatically closes and will remain closed until manually opened, but under no conditions will the valve remain open unless it is subjected to the pressure of the fluid as above stated.

Structurally the valve includes a body which is to be connected with the service pipe of a building and which is provided with a straight bore adapted to be connected with the service pipe and the supply pipe. Spaced valve chambers are located in the body, and a valve is arranged to move in each chamber. One of the said valves is spring pressed and both of the valves engage a lever which is adapted to close the valve which is not spring pressed when the spring pressed valve closes. Between the said valves is located a puppet valve which is adapted to engage the valve that is not spring pressed and serves as means for holding the last mentioned valve in an open position. This puppet valve is moved by the pressure of the fluid when the spring pressed valve is moved to an open position, and a spring is connected with the puppet valve for the purpose of closing the same when the first mentioned valves move to closed positions. By such an arrangement an automatically operating valve is produced and a source of danger is eliminated, inasmuch as when the valve members are at their closed positions the bore through the body is closed at three different points, thereby preventing the possibility of leakage of the fluid through the body.

For a full understanding of the invention reference is to be had to the following description and accompanying drawing, in which:

Figure 1 is a sectional view of the valve; Fig. 2 is an end view of the same; Fig. 3 is a perspective view of a valve member used in the valve structure.

Corresponding and like parts are referred to in the following description and indicated in all the views of the accompanying drawing by the same reference characters.

The valve consists of a body 1 having a longitudinal bore 2 and a counterbore 3 of greater diameter than the bore 2. The counterbore is concentric with the bore 2 and leads from the receiving end of the body 1 and terminates at a point midway between the ends of the said body constituting a shoulder 4 at the inner end of the said counterbore 3. A valve chamber 5 is provided at the receiving end portion of the body 1 and a valve chamber 6 is formed at the exit end portion of the body 1. The chambers 5 and 6 taper slightly. A tapered valve proper 7 is located in the valve chamber 5 and a tapered valve proper 8 is located in the valve chamber 6. The valves 7 and 8 are of such diameter that they completely close the bore and counterbore respectively when they are in position across the same. A bonnet 9 is mounted upon the body 1 over the valve chamber 5 and a seat 10 is screw threaded in the upper portion of the said bonnet 9. The seat 10 is provided at its under side with a face ground or concaved approximately at an angle of 45° to the vertical axis of the bonnet 9 and the said seat. A stem 11 passes through the center of the seat 10 and is provided with a bib 12 which at times is adapted to close the seat 10 and the beveled lower side thereof. The valve proper 7 is attached to the stem 11 but is spaced from the bib 12. A coiled spring 13 surrounds the lower portion of the stem 11 and bears at one end against the upper side of the valve proper 7 and the other end of the said spring bears against the seat 10. The spring 13 is under tension with a tendency to force the valve proper 7 in a downward direction. A nut 14 is screw threaded upon the upper end of the stem 11.

A bonnet 15 is positioned upon the body 1 above the valve chamber 6 and a seat 16 is screw threaded in the bonnet 15 and is normally positioned in the lower portion thereof. The seat 16 is provided at its upper side with a surface which is disposed approximately at an angle of 45° to the vertical axis of the bonnet 15 and the seat 16. A stem 17 passes through the center of the seat 16 and the valve proper 8 is carried at the lower end of the said stem 17. A bib 18 is formed upon the stem 17 and is adapted to close against the beveled surface of the seat 16. The upper end of the stem 17 projects above the top of the bonnet 15 and a nut 19 is screw threaded upon the upper end of the said stem. At a point between the bib 18 and the valve proper 8 the stem 17 is provided with an annular groove 20, the object of which will be explained hereinafter.

A post 21 is mounted upon the body 1 approximately midway between the bonnets 9 and 15. A lever 22 is fulcrumed at the upper end of the post 21 and is provided at its ends with bifurcations which receive the upper portions of the stems 11 and 17. The ends of the lever 22 bear directly against the under sides of the nuts 14 and 19.

A puppet valve is located in the body 1 between the valve chambers 5 and 6. Said puppet valve consists of a disk 23 which fits snugly within the bore 2 of the body 1. The said puppet valve also includes a stem 24 which passes centrally through the disk 23 and which is provided with a pointed end adapted to enter the groove 20 provided upon the stem 17. A spider 25 is mounted upon the stem 24 and is spaced from the disk 23 and is held in spaced position with relation thereto by means of bars 26 which are connected at their ends with the said disk and the said spider. A nut 27 is screw threaded upon that end of the stem 24 which is remote from the end thereof that carries the disk 23 and a spring 28 is interposed between the nut 27 and the shoulder 4. The spring 28 is under tension with a tendency to hold the disk 23 within the bore 2 of the body 1. The lower ends of the chambers 5 and 6 are closed by plugs 29, and if desired washers 30, of rubber or other suitable material, may be placed upon the beveled surfaces of the seats 10 and 16.

The operation of the valve is as follows: Presuming that the gas or fluid under pressure is admitted into the body 1 through the outer end of the counterbore 3 and the other end of the said body is connected with the service pipe of the building, an operator depresses that end of the lever 22 which is in engagement with the nut 19. At the same time the stem 17 is depressed which carries the bib 18 down in engagement with the seat 16. This movement on the part of the stem 17 moves the valve proper 8 down into the lower portion of the chamber 6 so that the upper end of the said valve proper 8 is approximately in alinement with the lower side of the bore 2. At the same time that the lever 22 is swung the stem 11 is moved in an upward direction so that the bib 12 carried thereby is engaged with the under side of the seat 10, and the valve proper 7 carried by the stem 11 is lifted above the counterbore 3. Thus the fluid under pressure passes along the counterbore and enters the inner end portion of the bore 2 and this pressure against the disk 23 forces the said disk into the valve chamber 6 against the tension of the spring 28 which engages the nut 27 upon the stem 24 which carries the said disk. The pointed end of the stem 24 enters the groove 20 in the stem 17 and thus the fluid under pressure may pass through the counterbore 3 and the bore 2 into the service pipe of the building. The pressure of the fluid bearing against the lower end of the valve proper 7 and the upper end of the valve proper 8 will hold the said valves open against the tension of the spring 13 which bears against the upper end of the valve proper 7, and the pressure of the said fluid bearing against the side of the disk 23 will hold the said disk in the valve chamber 6. If for any reason the flow of the fluid under pressure is interrupted the pressure against the valves proper 7 and 8 is removed, and consequently the spring 28 will move the disk 23 back in the bore 2 and close the same. At the same time the valve proper 7 is closed by the pressure of the spring 13 so that the passageway through the counterbore 3 is interrupted and through the lever 22 the stem 17 is moved so that the valve proper 8 is moved transversely across the bore 2 and closes the same. The parts will remain in these positions until that end of the lever 22 which is in engagement with the nut 19 is again depressed, and if the pressure of the fluid supply to the body 1 has been reëstablished the parts will open and remain in opened positions. If, however, the pressure of the fluid has not been reëstablished, the parts will immediately assume closed positions as soon as the downward pressure upon the end of the lever 22 is removed. Therefore when a service pipe in a building is equipped with such a valve and the service pipe is used for leading in gas, the lights which are burning at the jets in the building will go out as soon as the supply of gas from the supply of street pipe has been interrupted and the valve will close. If the pressure of the gas in the street or service pipe is reëstablished before the cocks at the gas jets have been turned off, the valve as hereinbefore described will prevent the gas from entering the service pipe and therefore the gas will not escape at the jets controlled by the said cocks. Therefore the occupants of the building will have ample opportunity to turn off the gas cocks, and when the valve as hereinbefore described is opened manually as indicated, the gas in the service pipe of the building is confined or controlled therein.

Having thus described the invention, what is claimed as new is:

1. A valve comprising a body having a bore and provided with spaced valve chambers disposed transversely of the bore, valves proper located in the valve chambers and operatively connected together, and a pressure operated valve located in the bore between the valve chambers and arranged to move into one of the valve chambers when in open position.

2. A valve comprising a body having a bore and provided with spaced valve chambers disposed transversely of the bore, valves proper located in the valve chambers and operatively connected together to move simultaneously to close the bore, a puppet valve located in the bore between the valve chambers and comprising a disk adapted to fit snugly in the bore, a stem carrying said disk and having an end adapted to engage one of the said valves proper, a spider mounted upon said stem, and spacing bars interposed between the spider and the disk.

3. A valve comprising a body having a bore and provided with spaced valve chambers disposed transversely of the bore, valves proper located in the chambers and operatively connected together to move simultaneously to close the bore, a puppet valve located in the bore between the valve chambers and consisting of a disk adapted to fit snugly within the bore, a stem carrying said disk and having a pointed end adapted to engage one of the valves proper, a spider mounted upon the stem, spacing rods connecting the spider with the disk, and a spring located within the body and engaging said stem and adapted to move the same to normally hold the disk in close position in the bore.

4. A valve comprising a body having a bore and provided with spaced valve chambers disposed transversely of the bore, bonnets mounted upon the body over the valve chambers, seats adjustably supported in said bonnets, valves proper located in the valve chambers, stems connected with said valves proper and passing through the valve seats, said stems carrying bibs adapted to engage the seats, and means operatively connecting the stems together to move the valves proper simultaneously in opposite directions to close the bore and to move the bibs simultaneously in opposite directions to engage the seats.

In testimony whereof I affix my signature in presence of two witnesses.

CORNELIUS SPILLAN. [L. S.]

Witnesses:
WM. J. HARRINGTON,
MICHAEL J. COTTMAN.

---

Copies of this patent may be obtained for five cents each, by addressing the "Commissioner of Patents, Washington, D. C."